Jan. 3, 1967 J. B. JAMES 3,296,595

DELAYED SYNCHRONOUS MEMORY SELECTION DEVICE

Filed July 30, 1963 2 Sheets-Sheet 1

INVENTOR
JOHN BERNARD JAMES
BY
Kane and Nydick
ATTORNEY

DELAYED SYNCHRONOUS MEMORY SELECTION DEVICE

Filed July 30, 1963 2 Sheets-Sheet 2

INVENTOR
JOHN BERNARD JAMES
BY Hane and Nydick
ATTORNEY

United States Patent Office 3,296,595

Patented Jan. 3, 1967

3,296,595

DELAYED SYNCHRONOUS MEMORY SELECTION DEVICE

John Bernard James, London, England, assignor to International Computers and Tabulators Limited Filed July 30, 1963, Ser. No. 298,604
Claims priority, application Great Britain, Aug. 1, 1962, 29,553/62
9 Claims. (Cl. 340—172.5)

This invention relates to information storage devices.

The conventional two dimensional and three dimensional selection systems for relatively large matrix stores require that at least some of the driving and/or sensing conductors are coupled to a large number of individual storage elements. Such a store may be constructed from an assembly of magnetic thin film storage plates similar to that described in an article entitled "Making Reproducible Magnetic Film Memories," by E. M. Bradley, published in "Electronics" for Sept. 9, 1960.

One practical form of thin film matrix store, in which each plate stores 32 words and each digit line is coupled to one digit position of 2048 words, requires a digit line length of approximately 30 feet. The above mentioned article explains that the digit lines behave as low impedance transmission lines. The time taken for a current pulse to propagate along a line with particular design constants is proportional to the length of the line. In the present case, a 30 foot line has a propagation time of approximately 75 ns. This time delay will affect both reading and writing in the store, and it is comparable with the rise time necessary for the driving pulses in order to achieve a read/write cycle time of, say, 1 microsecond or less. Consequently, the propagation time may be a serious limitation in the achievement of a large capacity store with a relatively short cycle time.

It is the object of the invention to reduce the effect of line propagation time on the operation of the store.

According to the invention an information storage device with a plurality of immediately accessible storage locations includes a source of signals for initiating the generation of operating signals which are applied to the storage locations to effect a read and/or write operation; a source of address signals; first means controlled by the address signals and operative to select the storage location at which the operating signals are effective; and second means controlled by said address signals and operative to select the timing of the operating signals.

According to one aspect of the invention an information storage device includes at least one elongate information conductor inherently having a relatively long propagation time; a plurality of immediately accessible storage locations arranged along said information conductor and coupled thereto, information means operable to apply a signal representing an information item to said information conductor, which signal is progressively delayed during propagation along said information conudctor; a source of signals for initiating the operation of the information means and the generation of operating signals which are applied to the storage locations to effect a write operation; a source of address signals; first means controlled by the address signals and operative to select the storage location at which the operating signals co-operate with the information signal to write the item of information; and second means controlled by said address signals and operative to select the timing of the operating signals so that the operating signals and the information signal are in predetermined time relationship at the selected storage location.

According to another aspect of the invention an information storage device includes at least one elongate information conductor inherently having a relatively long propagation time; a plurality of immediately accessible storage locations arranged along the information conductor and coupled thereto; a sense amplifier connected to one end of said information conductor and operable to produce an output signal in response to an information signal on said conductor; a source of signals for initiating operation of the sense amplifier during a predetermined time interval and for initiating the generation of read operating signals which are applied to the storage locations to effect a reading operation; a source of address signals; first means controlled by the address signals and operative to select the storage location at which the reading signal is effective to induce in the information conductor an information signal representing the information stored in the selected location; and second means controlled by said address signals and operative to select the timing of the read operation signals so that the information signal is applied to the sense amplifier during said predetermined time interval.

The invention will now be described by way of example with reference to the accompanying drawings in which.

Figure 1:
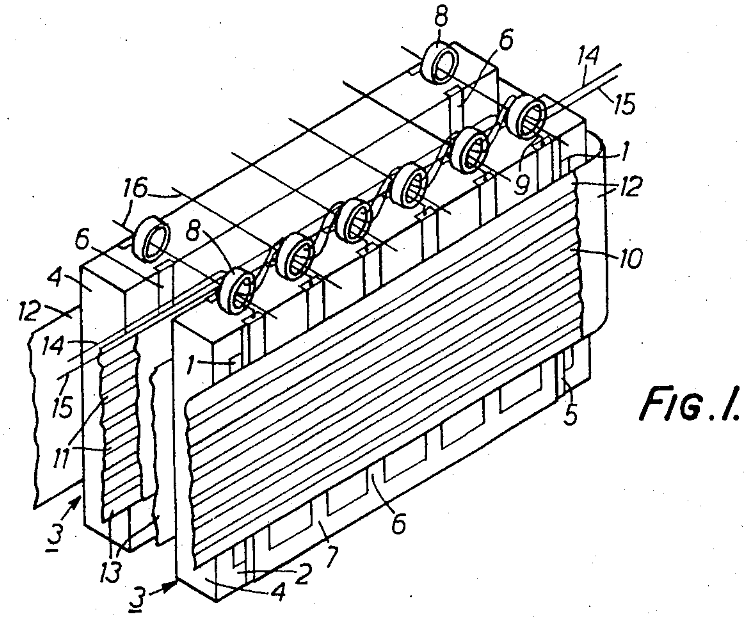
FIGURE 1 shows two pairs of storage plates of an information storage device.
Figure 3:
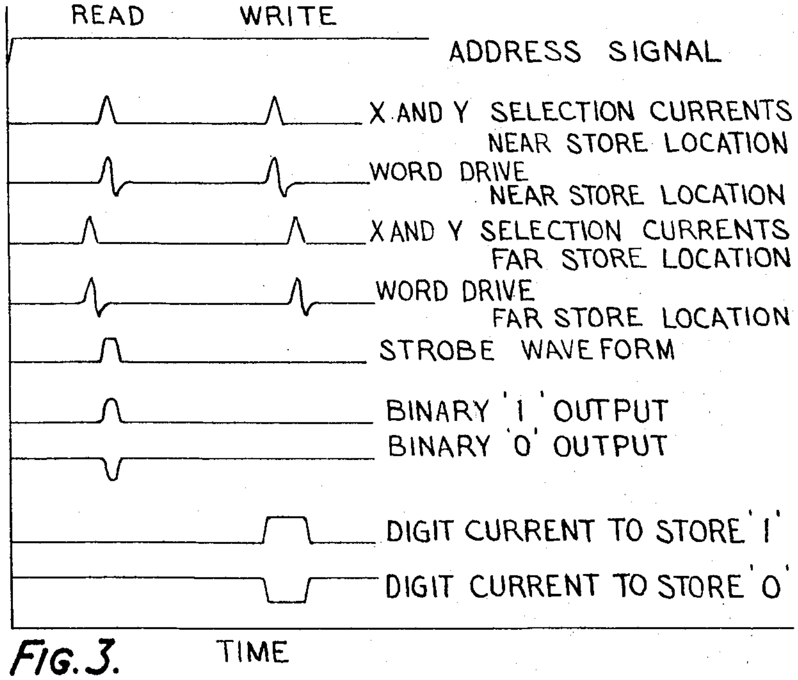
FIGURE 3 is a timing diagram for the storage device.

The information store consists of a plurality of storage plates, each of which operates in a manner generally similar to that described in the article by Bradley already referred to. Briefly, each storage plate consists of a square of thin magnetic film 1 deposited on a metal substrate 2. Storage plates are supported in pairs 3 in frames (not shown) with the film areas 1 of each pair of plates facing outwards. A metal block 4 is interposed between the plates. A separate plastic film 5 is wrapped around each pair of plates and carries a set of strip line word conductors 6. One part of each conductor 6 extends in close proximity to the film area 1 of one plate and the other part of each conductor 6 extends in close proximity to the film area 1 of the other plate of the pair. The set of conductors 6 consists of 32 conductors, of which only a few are shown for the sake of clarity. The conductors 6 may have a common conductive area 7 where the film 5 passes around the lower edge of the plate pair. Each plate pair 3 carries a set of toroidal magnetic switch cores 8. The cores 8 are each coupled to a separate one of the conductors 6 by means of single turn windings consisting of resistive wire links 9 connected between the free ends of the conductors 6. Thus each conductor 6 and the wire link 9 connected thereto forms a closed loop coupled to one of the cores 8. For clarity only two of the cores and two of the conductors 6 are shown on the rear plate pair but it should be understood that each plate pair is provided with a complete set of conductors and cores.

Two sets of strip line digit conductors 10, 11 sandwiched between pairs of plastic films 12, 13 respectively, are arranged in sinuous form with the pairs of plates interposed between the conductors 10 and 11 so that the conductors 10 are magnetically coupled with the magnetic film 1 of one plate of each pair and the conductors 11 are magnetically coupled with the magnetic film 1 of the other plate of each pair. Each set of conductors 10, 11 consists of 26 conductors of which only a few are shown for the sake of clarity. The metal spacers 4 are interconnected to form a return path for the digit conductors 10, 11. Each of the conductors 10, 11 forms with the return path a transmission line which is terminated at one end by means of resistors connected between the conductors and the return path.

The word conductors 6 and the digit conductors 10, 11 lie approximately along the easy and hard axes, respectively, of the film. The part of the film adjacent to each crossing of the word and digit conductors forms an individual binary storage element. Each word conductor 6 is coupled to all the storage elements for a particular word, half the storage elements being on one plate of the pair and the other half being on the other plate of the pair. Each digit conductor 10, 11 is coupled to one storage element of each word storage location of the store. Whilst only two plate pairs 3 are shown in FIGURE 1 it is to be understood that a practical storage block would consist of a large number of plate pairs. For example a storage block for 2048 words consists of 64 pairs of plates each plate pair storing 32 words of 52 digits. Each core 8 is threaded by a bias conductor 14, an X selection conductor 15 and a Y selection conductor 16. The conductors 15 each thread all the cores 8 on a plate pair and the conductors 16 each thread one core on each plate pair to form a conventional biased coincident current core selection matrix. The bias conductor 14 threads all the cores of the matrix and carries a D.C. bias current. Thus, any selected switch core may be switched by energising appropriate lines of the selection matrix of which it forms part. The cores are arranged in groups, rather than in one large matrix, to avoid limitation of the switching speed due to the inductance of the core windings and also to reduce the spurious outputs resulting from the small output currents produced by those switch cores which receive one of the selection currents.

A word of information is read out from a selected word storage location of the storage device by causing a current pulse to flow in the corresponding word conductor 6. This produces a magnetic field which aligns, approximately along the hard axis, the magnetic vectors of all the storage elements which are coupled to that word conductor. The digit conductors 10, 11 are utilised as sense conductors instead of providing separate sense conductors as described by Bradley. The angular movement of the vectors induces pulses in the digit conductors 10, 11, the polarity of the pulse depending upon the original position of the vector.

A word of information is written into a selected word storage location by causing a current pulse to flow in the word conductor and by applying a digit current pulse of one polarity or the other polarity to each digit conductor 10, 11 according to whether a one or zero is to be written in the respective digit positions of the word storage location. The digit pulse is maintained during decay of the word pulse and determines the direction in which the magnetic vector relaxes into alignment with the easy axis, one direction representing storage of a binary one and the other direction representing storage of a binary zero.

The current pulses in the word conductors 6 which are required for reading and writing are produced by switching the core 8 coupled to the conductor 6. Any selected core 8 is switched by the application of coincident selection current pulses to the conductors 15, 16 which thread the selected core. The selection currents are each of a magnitude equal to the bias current but are of opposite sign to the bias current so that application of only one of the selection currents merely results in cancelling the effect of the bias current and the core is not switched. Application of both selection currents in coincidence overcomes the effect of the bias current and causes the core to switch. On termination of the selection current pulses the bias current causes resetting of the core. Resetting the core induces an inverse polarity current pulse in the word conductor 6 and therefore during writing the digit current pulse is maintained until the reverse pulse has decayed sufficiently. In a reading operation the output from the digit conductors is strobed so that signals induced due to the reverse word pulse are not passed to the output.

A modified method of writing may be used, in which the pulse of current in the word conductor 6 is of the opposite polarity to the pulse of current when reading. This method of operation is shown and described in British Patent No. 942,561. The current pulse of one polarity required for reading is obtained by applying coincident selection currents to the core as described above. The pulse of opposite polarity for writing is obtained by maintaining the selection currents from the time of reading until the time of writing when termination of the selection currents results in the core 8 switching back to its original state and the consequent induction of a reverse current pulse in the conductor 6.

Figure 2:
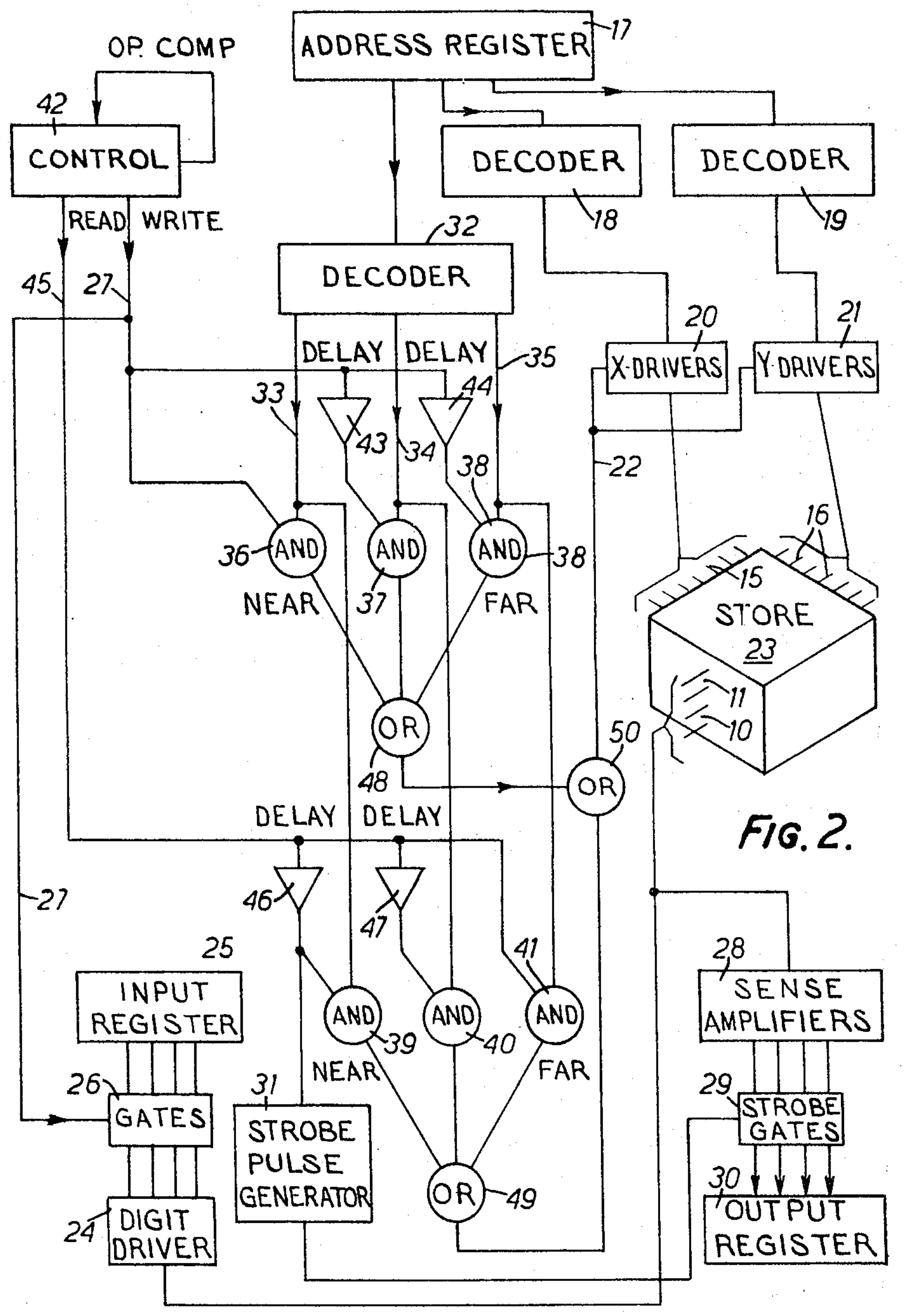
FIGURE 2 is a block diagram of the selection and driving arrangements for the storage device.

Referring now to FIGURE 2 the address of a storage location at which it is desired to perform a reading and/or writing operation is entered into an address register 17. Address signals from the register 17 are decoded by decoders 18, 19 to enable a selected one of a plurality of X drivers 20 and a selected one of a plurality of Y drivers 21 respectively. A signal on line 22 is applied to the drivers 20 and 21 to cause the selected drivers enabled by the decoder to pass selection currents at predetermined times respectively through that X conductor 15 and that Y conductor 16 of the store 23 which are connected to those drivers.

Each of the digit conductors 10, 11 is connected to the output of a separate one of a number of digit drivers 24. An input register 25 is connected through a number of gates 26 to the inputs of the digit drivers 24. The digit drivers 24 are operable to apply a current pulse of one or other polarity to the digit conductors 10, 11 in dependence upon signals representing binary digits of a word of information entered into the input register 25 and passed by the gates 26, when opened by a signal on line 27, to the digit drivers 24.

The digit conductors 10, 11 are also connected to the inputs of separate sense amplifiers 28. The outputs of the sense amplifiers 28 are connected through strobe gates 29 to an output register 30. The strobe gates 29 are normally closed and are opened for a predetermined time interval by a signal from a strobe waveform generator 31. The output circuits of the digit drivers are isolated from the input circuits of the sense amplifiers and this may be accomplished as described in British Patent No. 1,000,277. The digit conductors are arranged in a balanced arrangement with diodes presenting a low impedance to the relatively high digit driver current and presenting a high impedance to the relatively low induced sense currents.

It has already been mentioned that the propagation time of a pulse along the digit conductor in a 2048 word store, which for example may consist of 64 pairs of plates, may be about 75 ns. The effect of this delay on reading and writing operations will now be considered. Considering first the effect on reading operations the induced pulses will be transmitted to the sense amplifiers 28 substantially coincidentally with timing of the pulse in the word conductor 6 if the storage elements are coupled to the digit conductors 10, 11 at points which are spaced by only a small distance from the ends of the conductors 10, 11 which are connected to the sense amplifiers. However, if the selected word is such that the storage elements are coupled to the far end of the digit conductors, then the induced pulses will suffer the full transmission delay and will arrive at the sense amplifiers 75 ns. later than if the word storage elements had been coupled to the digit conductors at a point close to the sense amplifiers. It will be apparent that the pulses from storage elements coupled to intermediate points along the digit conductors will suffer proportionate delays. Thus the time at which the sense amplifiers may receive a pulse would vary over a period of 75 ns. in dependence on which word location has been read. This variation may be substantially greater than the duration of the induced reading pulse.

This timing variation of the reading pulse is particularly serious since, in order to select the peak of the reading pulse, the output from the sense amplifiers is strobed. Strobbing provides an effective increase in the signal/noise ratio of the storage system by making the amplifiers sensitive only when the peak of the reading signal occurs, and thus reducing the response to spurious signals occurring at other times, such as the disturbance voltages produced when a digit current pulse ceases. Clearly, if the duration of the strobe pulse has to be increased sufficiently to cover reading pulses with any delay from zero to 75 ns. it cannot act as a true strobe for any particular pulse timing and much of the advantage of the strobing system is lost.

In a writing operation it is necessary to establish the digit current at the selected storage location coincidentally or slightly before the word current pulse. The easy axis field produced by the digit current is such that it cannot determine the direction of relaxation of the magnetic vector unless the hard axis field produced by the word current has fallen to say 10% of the peak value before the digit current starts to fall. Consequently the timing of the trailing edge of the digit current pulse must also be accruately timed in relation to the word current pulse. Due to the transmission delay of the digit conductors the digit current pulse would be effective at storage locations remote from the digit driver end of the conductor later than at locations near the digit driver. Therefore if the relative timing of applying the word current and the digit current to the respective conductors is fixed it would be necessary to extend the length of the digit current pulse by at least the maximum delay along the conductor to ensure that the digit current would be effective at any storage location. This has the disadvantage of extending the store cycle time.

There is a further advantage in varying the time of the driving pulse in accordance with the address. A reading pulse must not be applied to the sensing amplifier until it has recovered from the disturbance voltages produced by the removal of the digit current at the end of the previous writing cycle which may take as long as 400 ns. Consequently, with fixed timing, reading cannot start until the amplifier has recovered and a further 75 ns. may then elapse in waiting for the reading signal to travel down the digit conductor. On the other hand, with variable timing, the driving pulse may be advanced so that the reading pulse reaches the sensing amplifier as soon as it has recovered, that is, the driving pulse for an address with a long delay is applied before the amplifier has fully recovered.

This problem can be overcome by making the basic timing of the system a function of address of the selected word. For any given physical arrangement of the store, it is possible to specify the transmission delay which will be suffered by reading pulses produced from any particular word address. Consequently, it is theoretically possible to cause the addressing device to not only select the appropriate switch core, but also to select the appropriate timing for the system. In practice, of course, it would be neither necessary nor economic to select a different timing for every address. The difference in transmission delay between different addresses on a single plate would probably be less than the variation in timing due to circuit tolerances, such as the minor differences between individual switch cores, selection current generators, etc. Consequently, sufficient compensation may be obtained by selecting different system timings for groups of addresses. For example, it might be convenient in the present case to group the plate pairs in eight groups of eight plate pairs each. Thus, if the word addresses are arranged consecutively, any address from 0000 to 0255 would select one timing, any address from 0256 to 0511 would select another timing and so on.

The required variation in timing is determined by partially decoding the address entered into the register 17 by means of a decoder 32 to provide a signal on one of a number of lines 33, 34, 35 in dependance upon the group of plate pairs in which the address storage location is located. For simplicity only three lines are illustrated and the store will be considered to be divided into three groups of near, intermediate and far locations. However, in practice a larger number of groups would be used and a separate line provided for each group of plate pairs. The lines 33, 34, 35 are connected to one input of AND gates 36, 37, 38 respectively and to one input of AND gates 39, 40, 41 respectively.

A control unit 42 is connected by a line 27 to the gates 26 and the AND gate 36. The line 27 is also connected to the AND gates 37, 38 through delay units 43, 44 respectively. The control unit 42 is connected by a line 45 to the AND gate 41, through delay units 46, 47 to the AND gates 39, 40 respectively and also to the strobe generator 31 through a delay unit 46. The outputs of AND gates 36, 37, 38 are connected to an OR gate 48 and the output of AND gates 39, 40, 41 are connected to an OR gate 49. The outputs of OR gates 48, 49 are connected through an OR gate 50 to line 22 and hence to the X and Y drivers 20, 21.

For a read operation the control unit 42 is caused to generate a read initiating signal on line 45. The output of decoder 32 opens gate 39 for the near group of the store, gate 40 for the intermediate group or the gate 41 for the far group. The initiating signal is therefore passed through the OR gates 49, 50 to the line 22 either with no delay, a first delay or a second delay in dependence upon whether the far, intermediate or near group of the store is addressed. The initiating signal is also passed with the second delay to operate the strobe generator 31. Therefor if the near group of the store is addressed the word current is generated at the same time as the strobe gates 29 are opened since there is substantially no delay in transmission of the sense signal from the near storage locations. However, if a far location is addressed the X and Y drivers 20 and 21 are operated before the strobe generator 31 by a time interval which is equal to the transmission delay from the far storage location. Similarly for an intermediate location the drivers are operated at an intermediate time. Thus the strobe gates are opened at a time determined by the initiating signal on line 45 and the XY drivers are operated at a time which is sufficiently early to ensure that the sense signals are received at the strobe gates 29 during the time in which the latter are opened by the strobe pulse.

For a write operation, the control unit is caused to generate a write initiating signal on line 27. The output of decoder 32 opens gate 36 for near storage locations, gate 37 for intermediate storage locations or gate 38 for far storage locations. The write initiating signal is passed to operate the digit drivers 24 to provide digit representing currents on conductors 10 and 11. The write initiating signal is also passed for a near storage location by gate 36 with no delay to the OR gate 48 and then to the X and Y drivers through OR gate 50. Thus for near locations with substantially no transmission delay the X and Y drivers are operated to provide a word current during the application of the digit currents. However for far storage locations the gate 38 is opened and the X and Y drivers are operated after a delay substantially equal to the transmission delay along the conductors 10, 11 to the far location. Similarly for intermediate storage location gate 37 is opened and the word current is delayed to a lesser extent. Alternatively in a reading operation, the read initiating signal on line 45 may be applied directly to the OR gate 50 to operate the X and Y drivers 20, 21 and the strobe generator 31 is operated at a selected time by applying the read initiating signal to a gated delay network. The network consisting of gates 36, 37, 38, 48 and delay units 43, 44 utilised for selecting the timing of the write initiating signal or a separate similar network may be used to select the timing of the strobe generator operation.

In the above description for simplicity it has been assumed that the gates, decoders and drivers do not cause any delay to the signals. However, in practice each unit will introduce a small delay. Consequently this must be allowed for when determining the length of delay which is required to be produced by the delay units. Whilst separate delay units have been illustrated the desired delays may be obtained by tapping off a single delay line. Also the X and Y drivers may be formed by the final stages of the decoders 18 and 19 which are operated at the desired time by the signal on line 22 being applied to a transistor switch in the supply to the driver stages.

Also if desired the function of the decoder 32 may be performed by decoder 18 and/or 19 in which case the decorder 32 is omitted and the gates 36 to 41 inclusive are connected to suitable points in decoder 18 and/or 19.

It will be appreciated that the invention is not limited to use with the particular form of store described. It is equally applicable to other forms of store in which transmission delay makes the time of occurrence of signals within the store dependent upon the address of the word which is selected.

I claim:

1. An information storage device with a plurality of immediately accessible storage locations, including a source of signals for initiating the generation of operating signals which are applied to the storage locations to effect a read and/or write operation; a source of address signals; first means controlled by the address signals and operative to select the storage location at which the operating signals are effective; and second means controlled by said address signals and operative to select the timing of the operating signals.

2. An information storage device including at least one elongate information conductor inherently having a relatively long propagation time; a plurality of immediately accessible storage locations arranged along said information conductor and coupled thereto; information means operable to apply a signal representing an information item to said information conductor, which signal is progressively delayed during propagation along said information conductor; a source of signals for initiating the operation of the information means and the generation of operating signals which are applied to the storage locations to effect a write operation; a source of address signals; first means controlled by the address signals and operative to select the storage location at which the operating signals co-operate with the information signal to write the item of information; and second means controlled by said address signals and operative to select the timing of the operating signals so that the operating signals and the information signal are in predetermined time relationship at the selected storage locations.

3. An information storage device including at least one elongate information conductor inherently having a relatively long propagation time; a plurality of immediately accessible storage locations arranged along the information conductor and coupled thereto; a sense amplifier connected to one end of said information conductor and operable to produce an output signal in response to an information signal on said conductor; a source of signals for initiating operation of the sense amplifier during a predetermined time interval and for initiating the generaton of read operating signals which are applied to the storage locations to effect a reading operation; a source of address signals; first means controlled by the address signals and operative to select the storage location at which the reading signal is effective to induce in the information conductor an information signal representing the information stored in the selected location; and second means controlled by said address signals and operative to select the timing of the read operating signals so that the information signal is applied to the sense amplifier during said predetermined time interval.

4. An information storage device including at least one elongate information conductor inherently having a relatively long propagation time; a plurality of immediately accessible storage locations arranged along the information conductor and coupled thereto; a sense amplifier connected to one end of said information conductor and operable to produce an output signal in response to an information signal on said conductor; a source of signals for initiating the generation of read signals which are applied to the storage locations to effect a reading operation and for initiating the generation of operating signals to operate the sense amplifier; a source of address signals; first means controlled by the address signals and operative to select the storage location at which the reading signal is effective to induce in the information conductor an information signal representing the information stored in the selected location; and second means controlled by said address signals and operative to select the timing of the operating signals so that the sense amplifier is rendered operative at the time of receiving the information signal.

5. An information storage device as claimed in claim 2 in which each storage location is capable of storing an information item comprising a number of digits and consists of a like number of digit locations, and in which a number of elongate information conductors are provided, each digit location being coupled to one of said information conductors and corresponding digit locations of the storage location being coupled to the same information conductor.

6. An information storage device as claimed in claim 5 in which the digit locations each consist of an area of thin bistable ferromagnetic film.

7. An information storage device as claimed in claim 2 in which easy storage location is coupled to a separate operating conductor to which read operating signals and write operating signals are applied to perform reading and writing operations respectively.

8. An information storage device as claimed in claim 7 in which each operating conductor is coupled to a separate bistable switching core and in which separate driving means are provided for switching each of the cores from a first state to a second state and back to the first state to induce an operating signal in the associated operating conductor in response to the initiating signals under the control of said first and said second means.

9. An information storage device as claimed in claim 2 in which said second means includes a plurality of signal paths each having a different signal transmission time; and a gate in each path controlled by said address signals.

No references cited.

ROBERT C. BAILEY, *Primary Examiner.*

R. B. ZACHE, *Assistant Examiner.*